United States Patent [19]

Bednar

[11] Patent Number: 5,404,999
[45] Date of Patent: Apr. 11, 1995

[54] FLEXIBLE LINER BAG FOR CONTAINING AN ABSORBENT MATERIAL

[76] Inventor: Donna M. Bednar, 330 Salem Church Rd., St. Paul, Minn. 55118

[21] Appl. No.: 920,772

[22] Filed: Jul. 28, 1992

[51] Int. Cl.⁶ .............................................. B65D 81/26
[52] U.S. Cl. .................................... 206/204; 206/223; 383/33; 383/89
[58] Field of Search .................... 206/204, 223, 524.4; 383/33, 34, 35, 70, 89; 220/404

[56] References Cited

U.S. PATENT DOCUMENTS

| | | |
|---|---|---|
| 2,585,214 | 2/1952 | Belmont . |
| 2,804,257 | 8/1957 | Hasler et al. ............ 383/36 |
| 3,189,253 | 6/1965 | Mojonnier ............ 383/35 |
| 3,674,135 | 7/1972 | Simon . |
| 3,934,803 | 1/1976 | Paulus, Jr. ............ 383/33 |
| 3,958,393 | 5/1976 | Whitener . |
| 3,977,450 | 8/1976 | Schampier . |
| 4,051,994 | 10/1977 | Donk et al. ............ 383/70 |
| 4,240,363 | 12/1980 | Troy ............ 383/70 |
| 4,509,570 | 4/1985 | Eby et al. . |
| 4,629,064 | 12/1986 | Barner ............ 206/204 |
| 4,720,011 | 1/1988 | Canamero . |
| 4,747,701 | 1/1988 | Perkins . |
| 4,801,006 | 1/1989 | Martin et al. . |
| 4,807,563 | 2/1989 | Berry et al. . |
| 4,815,590 | 3/1989 | Peppiatt et al. ............ 206/204 |
| 4,884,526 | 12/1989 | Giannakopoulos . |
| 4,932,360 | 6/1990 | O'Connor . |
| 4,951,605 | 8/1990 | Brown . |
| 4,953,704 | 9/1990 | Cortese . |
| 5,040,902 | 8/1991 | Eaton et al. . |
| 5,080,043 | 1/1992 | Fields . |
| 5,160,196 | 11/1992 | Curtis ............ 383/33 |
| 5,174,658 | 12/1992 | Cook et al. ............ 383/33 |
| 5,232,118 | 8/1993 | Samuel ............ 220/404 |

FOREIGN PATENT DOCUMENTS 2611666 3/1987 France .
2737617 3/1979 Germany .

OTHER PUBLICATIONS

Tidy Cat 3 Liners, Ed Lowe Industries, South Bend, Indiana, 1989.
Jonny Cat Liner Bags, Excel–Mineral Company, Goleta, California 1990.
Fresh Feliners Liner Bags, Minnetonka Corp., Soft Soap Enterprises, Inc. Undated.
Fresh Step Liner Bags, Clorox Company, Oakland, California, 1987.
Animal Cage Board, Techboard, Shephard Specialty Papers, Undated.
Animal Cage Board, Techsorb, Shephard Specialty Papers, Undated.
Drum Liners, Tank and Drum Accessories, Cole-Parmer Instrument Co., 1991.

Primary Examiner—David T. Fidei
Attorney, Agent, or Firm—Patterson & Keough

[57] ABSTRACT

The present invention discloses a flexible liner bag which may contain an absorbent material suitable for collecting and containing waste material. Bottom, side, and top edges of the bag are sealed, such that the absorbent material is contained within the bag. Retaining band is positioned on the bag near the top edges of the bag. A removal means is positioned on the bag between the top edges of the bag and the retaining band. The liner bag is used in a container to collect and contain waste products. A closure means is used to secure the bag for disposal.

5 Claims, 4 Drawing Sheets

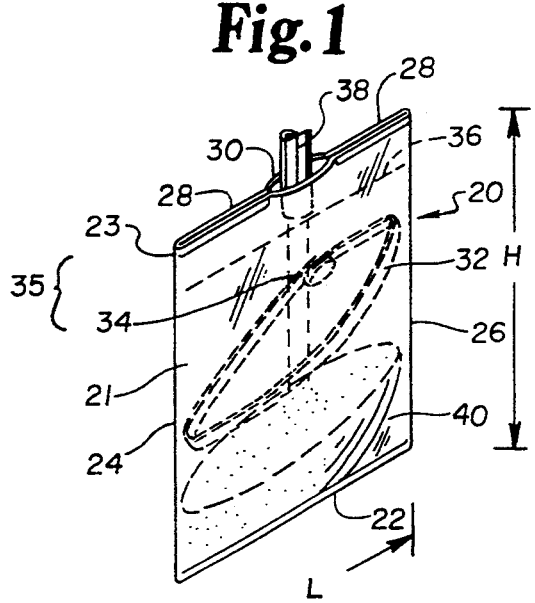
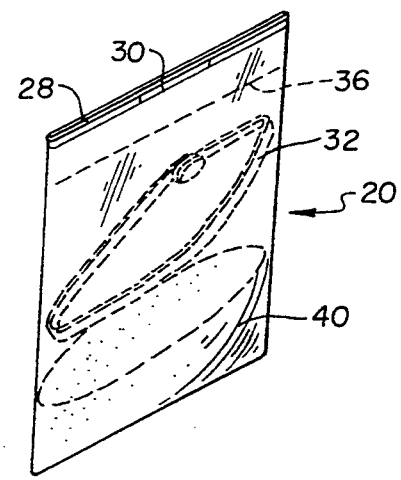
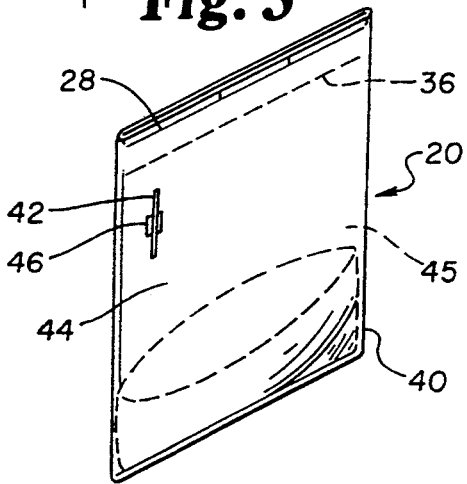
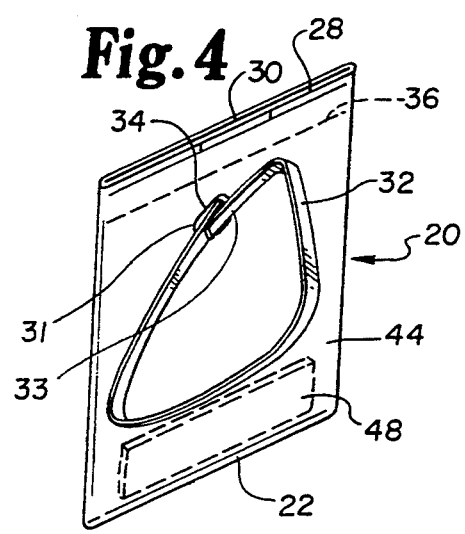

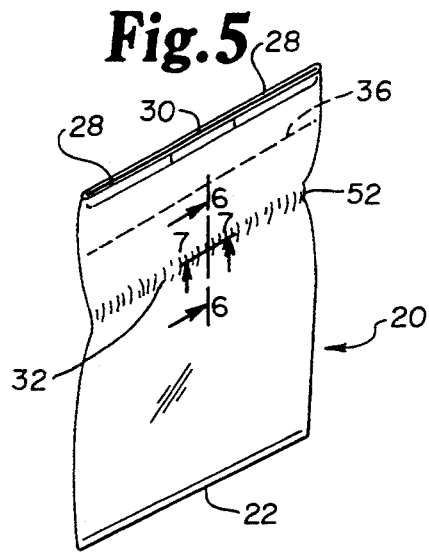
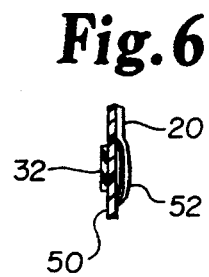
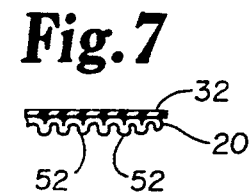
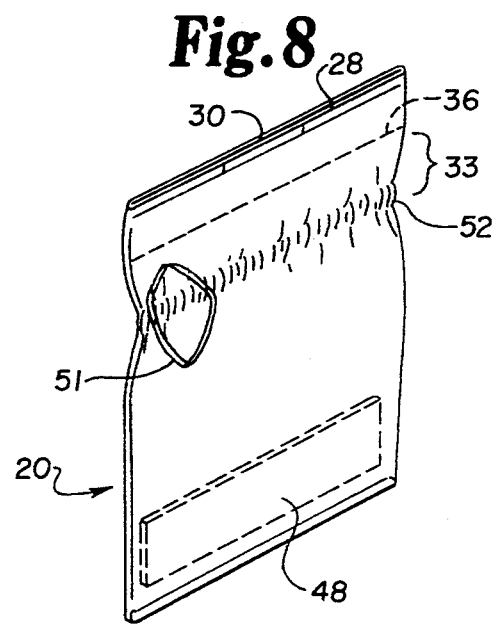
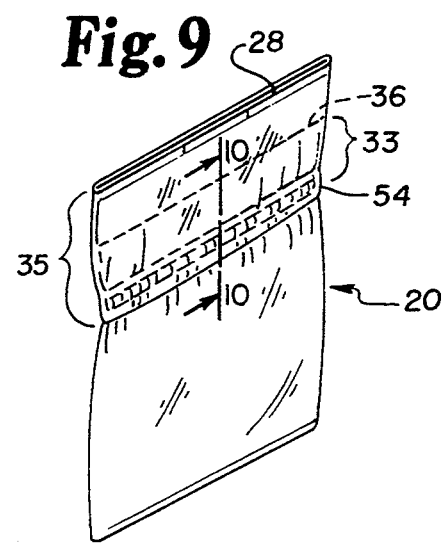

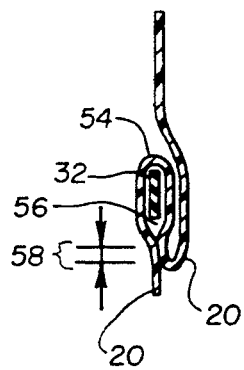
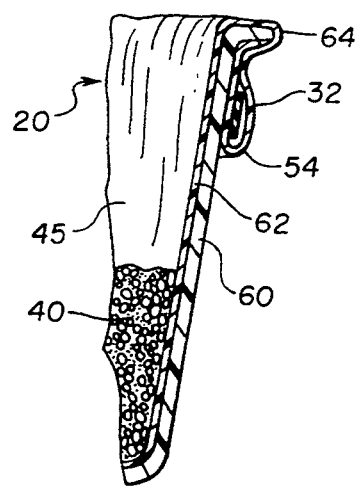
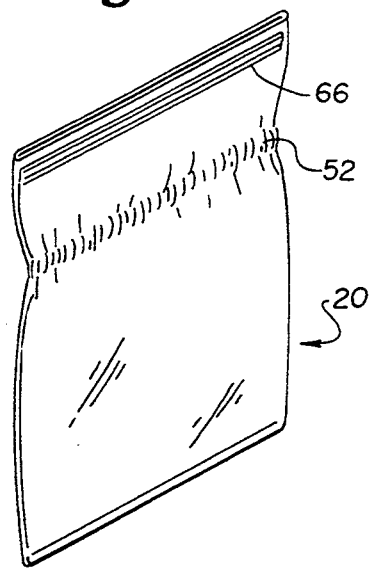
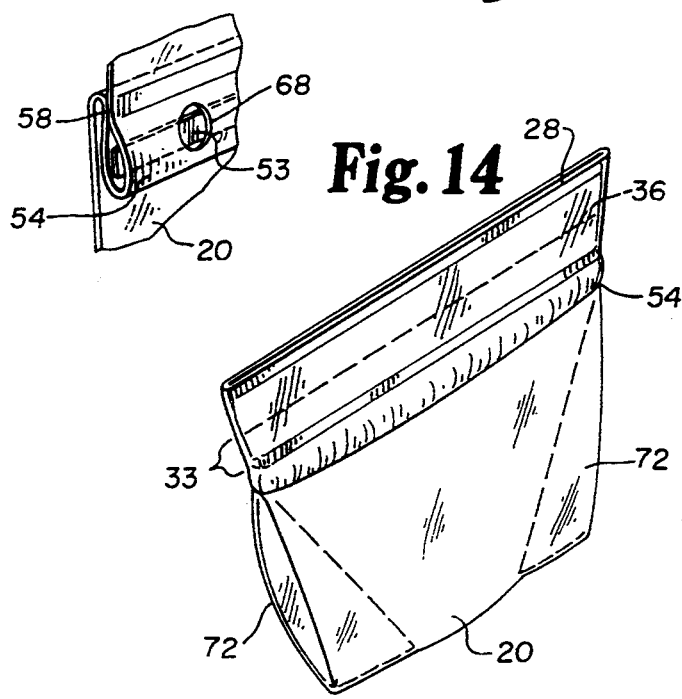
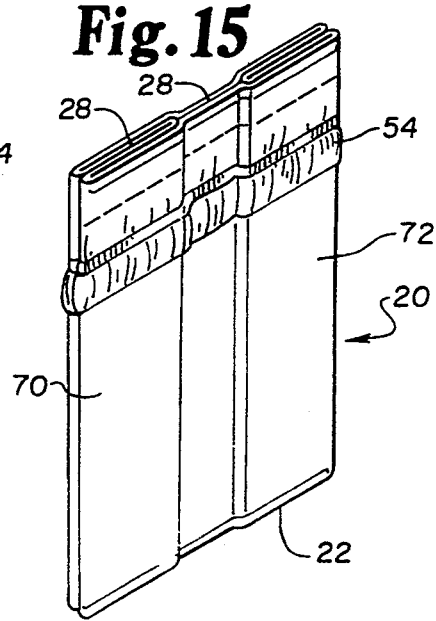

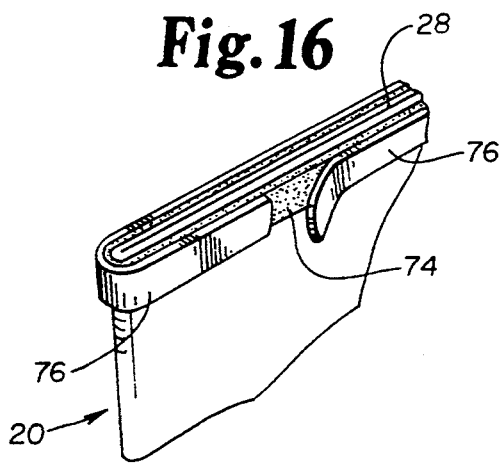
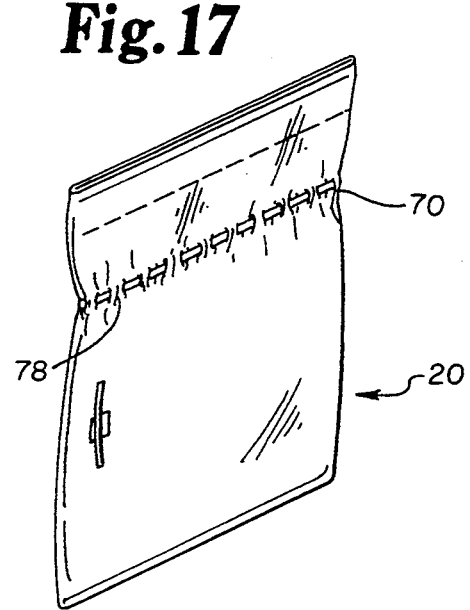

1

FLEXIBLE LINER BAG FOR CONTAINING AN ABSORBENT MATERIAL

FIELD OF THE INVENTION

The invention relates to a bag for containment of an absorbent product. In particular, the invention relates to a disposable liner bag which may include an absorbent product.

BACKGROUND OF THE INVENTION

Plastic bags are commonly used in lining containers, receptacles, boxes, and the like because of the protection afforded to the container, the ease of clean up and disposal, cost, and the ability to hold liquids. Liner bags are particularly useful in conjunction with animal litter boxes. The liner bags are typically positioned within the litter box, and then filled with an absorbent litter from a separate source. The boxes or liners are thrown away after the litter is soiled. In some instances, a rim lid of the litter box is utilized to retain the liner bag in place.

SUMMARY OF THE INVENTION

The invention relates to a bag for holding an absorbent product which is suitable for collecting and containing waste material. The bag comprises flexible front and rear panels which are joined and sealed along the top edges, the bottom edges, and the side edges. The bag also comprises removal means positioned near the top edges which permits the removal of a portion of the bag prior to use of the bag for collection and containment of the waste material. Retaining means are located on the bag between the removal means and the bottom edges for selectively retaining the front and rear panel top edges of the bag in an open, separate manner for receiving waste material. In addition, the flexible bag contains an absorbent material.

The invention also comprises a flexible bag having front and rear panels which are joined at the bottom edges and the side edges, the top edges forming an opening for accessing an interior portion of the bag. Removal means is positioned near the top edges which permits the removal of a portion of the bag prior to use of the bag for collection and containment of waste material. In addition, the bag has retaining means positioned between the removal means and the bottom edges of the bag for selectively retaining portions of the front and rear panels open and separated to receive the waste material after removal of the top portion of the bag.

The invention also comprises a flexible bag which is suitable for efficient filling with an absorbent product. The bag comprises flexible front and rear panels each of which have a top edge, a bottom edge, and two side edges, with the front and rear panels being joined and sealed along the bottom edges, and the top edges being sealed only along part of their length. Removal means is positioned proximate the top edges of the bag to facilitate removal of a top portion of the bag proximate the top edge of the bag. Retaining means is positioned on the flexible bag between the removal means and the bottom edges for selectively retaining portions of the front and rear panel open and separated to receive waste material after removal of the top portion of the bag. Closure means are positioned on the bag to secure the bag tightly for disposal.

The invention also relates to a method of filling a flexible bag with an absorbent material comprising the steps of providing a flexible bag having open top edges, sealing a portion of the top edges of the flexible bag inserting an absorbent material, and completing the seal on the top edge of the bag.

BRIEF DESCRIPTION OF THE DRAWINGS

FIG. 1 is a perspective view of one embodiment of the invention in a partially sealed state, showing the bag being filled with an absorbent product.

FIG. 2 is a perspective view showing the bag of FIG. 1 in a filled and sealed configuration.

FIG. 3 is a perspective view showing another embodiment of the invention.

FIG. 4 is a perspective view showing an alternative embodiment of the invention.

FIG. 5 is a perspective view showing another embodiment of the invention.

FIG. 6 is a fragmentary section taken along line 6—6 in FIG. 5.

FIG. 7 is a fragmentary section taken along line 7—7 in FIG. 5.

FIG. 8 is a perspective view of the invention shown in FIG. 5 with an absorbent pad within the bag.

FIG. 9 is a perspective view of an alternative embodiment of the invention.

FIG. 10 is a fragmentary section taken along line 10—10 in FIG. 9.

FIG. 11 is a fragmentary vertical cross section of the invention shown in FIGS. 9 and 10 in use.

FIGS. 12 is a perspective view of another embodiment of the invention.

FIG. 13 is a fragmentary perspective view of an alternative embodiment of the invention.

FIG. 14 is a perspective view of an alternative embodiment of the invention.

FIG. 15 is a perspective view of another embodiment of the invention.

FIG. 16 is a fragmentary perspective view of an alternative embodiment of the invention.

FIG. 17 is a perspective view of an alternative embodiment of the invention.

DETAILED DESCRIPTION OF THE INVENTION

In general, the present invention relates to a flexible liner bag having a unique closure cuff section near the top of the bag. An absorbent product may be contained within the bag. The liner bag and absorbent product may be utilized in a wide variety of containers or receptacles to collect waste products. The liner bag may also be used to dispose of the waste products.

Referring to FIG. 1, flexible liner bag 20 is shown in a partially sealed state. Liner bag 20 comprises at least a flexible front panel 21 and a flexible rear panel 23. Additional panels may be incorporated such as side gusset panels seen in FIG. 14. Each panel 21, 23 has a bottom edge 22, two side edges 24, 26, and a top edge 28. The panel bottom edges 22 are completely heat sealed along the entire length L of liner bag 20. Panel side edges 24, 26 are heat sealed along the entire height H of bag 20, or are joined together as a continuous piece of material, depending on the type or configuration of material used for liner bag 20.

As shown in FIG. 1, the top edges 28 of liner bag 20 are partially heat sealed, leaving access fill opening 30 in an unsealed, open state. Resilient retaining band 32 is attached to the interior surface 45 of liner bag 20, such as by an adhesive, by welding, or other means. Ends 31, 33 of retaining blind 32 overlap and are positioned on the adhesive or attachment point, as represented by glue spot 34. Removal tear strip 36 is positioned between panel top edges 28 and retaining band 32. Closure cuff 35 comprises the area including retaining band 32, removal tear strip 36, and panel top edges 28. Funnel or filler spout 38 is inserted into fill opening 30, and is utilized for the easy insertion of a product, such as an absorbent or granular product 40, into liner bag 20. Absorbent product 40 may be positioned throughout bag 20 or it may be directed to a portion of the bag.

Liner bag 20 may be made of a variety of materials, including, without limitation, polyethylene, cellophane, paper, biodegradable polyethylene, biodegradable natural fiber, and a metallic film such as sold under the trademark MYLAR, and other materials. Preferably, bag 20 is made of a durable, heavy-weight polyethylene plastic film material. The thickness of the plastic film material may vary from one to three millimeters, or be blended to be of a comparable thickness. The material comprising liner bag 20 may be in sheets or panels, or may be extruded in sheets or tubes. Preferably, an extruded tube plastic two millimeter thick film material is utilized for bag 20, since only the bottom edges 22 and the top edges 28 need be sealed. Alternatively, if two sheets of material are utilized for bag 20, the top edges 28, side edges 24, 26 and bottom edges 22 must be sealed. Alternatively, if only one sheet of material is utilized for bag 20, the side edges 24, 26 and the top edges 28 must be sealed. Bottom edge 22 is formed by folding the one sheet of material on itself, so bottom edge 22 need not be, for instance, heat sealed.

The invention includes optional use of double sheets of film material for use with heavy absorbent products or for large volumes of product/waste material. The double sheet liner bags may be secured together by an adhesive, by spot heating at several points, by thermobonding, or may be co-extruded so that the double sheet layers bond to each other while hot.

The dimensions of one embodiment of bag 20 are approximately twenty five to thirty five inches in height by nineteen to thirty six inches in length, although the dimensions may vary depending on the type of container being utilized. Opening 30 is approximately five to seven inches in length, although this dimension may also be varied to accommodate different sized funnel spouts 38. Retaining band 32 is made from a variety of polyurethane products, and is a flexible, stretchable material, or an elastic material, such as clear elastic sold under the LASTIN trademark. The removal of tear strip 36 is facilitated by a variety of techniques, such as perforations, areas of weakened bag material, a side panel having a notch, holes connected by perforations, or other such similar techniques. Absorbent material 40 is preferably positioned within the bag proximate the bottom edges 22, and may comprise a variety of absorbent or bedding products, such as particulate clay, animal box filler, pelletized wood such as pelletized aspen, pelletized agricultural products such as pelletized alfalfa, earthen soil such as peat, organic fertilizers, wood chips, recycled paper, pelletized paper sludge or other suitably absorbent materials. The absorbent material may be a biodegradable product, a renewable resource, or a recycled product.

FIG. 2 shows the liner bag 20 embodiment of FIG. 1 in a completely sealed state. Absorbent material or product 40 is already inserted through funnel 38 into liner bag 20. After funnel 38 is removed, opening 30 of bag top edge 28 is joined and heat sealed so that liner bag 20 retains absorbent product 40 during storage or shipment.

An alternative embodiment of filled liner bag 20 is shown in FIG. 3. A twist tie or closure seal 42 is removably attached to an outside surface 44 of sealed liner bag 20 by, for instance, an adhesive strip 46. Tear strip 36 is positioned between twist seal 42 and panel top edges 28. Twist seal 42 is used to securely re-close bag 20, after use, for disposal purposes.

FIG. 4 illustrates another embodiment of the liner bag invention. Absorbent sheet or pad 48 is inserted through opening 30 of liner bag 20 prior to sealing top edges 28. Alternatively, pad 48 may be positioned in bag 20 before top edges 28 are sealed. Retaining band 32 which can be glued on the inside surface 45 or outside surface 44 of bag 20, as shown in FIG. 4, or which can be heat sealed to bag 20, may be pulled and looped over the top of bag 20 to close bag 20 for disposal.

Pad 48 is useful for absorbing waste material. Pad 48 is particularly useful when used in combination with absorbent material 40. Absorbent pad 48 is preferably positioned proximate bottom edges 22 of the bag panels, although the position within the liner bag 20 may vary. Pad 48 may be adhered to the liner bag 20 using, for instance, glue or double sided tape. Absorbent pad 48 is selected from a variety of materials such as recycled or pressed papers, woven plastic, woven fabric, a combination of woven fabric and pelletized sludge, absorbent mats, pads or sheets of material, hazardous waste pads or other materials. Biodegradable or recycled products may be used for pad 48. Pad 48 may contain antibiotics or other treatments.

Referring now to FIG. 5, another embodiment of liner bag 20 is shown. As depicted in the above embodiments, the liner bag 20 of FIG. 5 has sealed bottom edges 22, sealed side edges 24, 26, sealed top edges 28, and sealed opening 30. As shown in FIGS. 5, 6, and 7, a length of retaining band 32 is secured to the entire interior circumference or interior surface of liner bag 20 by, for instance, heat welding, a heat bond or an adhesive bond 50. The length of retaining band 32 will vary depending on the size of the container in which the bag will be utilized, but the length of band 32 is preferably less than the circumference of bag 20. Band 32 is preferably secured to the interior surface 45 of liner bag 20 in a stretched state, although band 32 may be attached to the outside surface 44 of bag 20 (not shown). After attachment of band 32 to the interior surface 45 of liner bag 20, band 32 conforms to its relaxed state, thereby producing slight gathers 52 in liner bag 20. Tear strip 36 is positioned between gathers 52 and sealed top edges 28. As illustrated in FIG. 8, gathered liner bag 20 may contain an absorbent pad 48, or an absorbent product 40 (not shown). A small, separate loop 51 may be attached to the interior surface 45 or outside surface 44 of bag 20 in the closure cuff area 35 between tear strip 36 and gathers 52 which remains after removal of tear strip 36. Loop 51 may be, for instance, adhesively attached to bag 20. Loop 51 may be used to secure and close the top edges 28 of bag 20 for disposal.

FIG. 9 illustrates a preferred embodiment of liner bag 20 having a tunnel fold or casing to hold retaining band 32. Referring to FIGS. 9 and 10, tunnel fold 54 is formed by folding the material of liner bag 20 back on itself, preferably toward bottom edges 22, such that a casing or tunnel 56 is produced within the interior of liner bag 20. A length of resilient, retaining band 32 or other type of closure band material 53, such as a flexible plastic, is positioned within tunnel fold 54. The two sheets of liner bag 20 which form tunnel 56 are heat sealed, as shown at 58 in FIG. 10, so that retention of tunnel fold 54 is assured. The bag material is folded back again up and over tunnel fold 54, away from bottom edges 22. Depending on the length and type of material of retaining band 32 utilized, gathers may be produced in liner bag 20. It is preferred that tunnel fold 54 be positioned on the interior surface 45 of bag 20, to further protect retaining band 32. In the embodiment of FIG. 9, closure cuff 35 comprises the area including and between tunnel fold 54 and bag top edge 28. A section or portion 33 of liner bag 20 remains above retaining band 23 after removal of tear strip 36. A closure means may optionally be incorporated into this embodiment of liner bag 20 to tightly close bag 20 for disposal after use, including a twist tie 42 shown in FIG. 3, attaching an elastic loop 51 as shown in FIG. 8, creating an access port 68 in tunnel 56 as shown in FIG. 13, or by skipping a section of seal 58 to allow the formation of an access hole. Alternatively, retaining band 32 may be used to close bag 20 by pulling retaining band 32 up and over the top edges 28 of bag 20 and then tightly securing bag 20 for disposal.

FIG. 11 shows liner bag 20 positioned in a container 60. As seen in FIG. 11, the liner bag embodiment of FIG. 9 and FIG. 10 is illustrated, although alternate embodiments may be used. The portion of liner bag 20 containing granular or absorbent product 40 is placed in the interior, receiving area 62 of container 60. Tunnel fold 54 containing retaining band 32 is stretched over and placed under rim 64 of container 60. Retaining band 32, in a stretched state, securely retains the remaining portion of closure cuff 35 of liner bag 20 around container 60 after removal of tear strip 36. If a material other than an elastic type band 32 is used, it should be positioned so that bag 20 is securely held and retained against container 60. The weight of absorbent product 40 keeps bag 20 within interior 62 of container 60. Container 60 may include a wide variety of container types, including, but not limited to, animal litter boxes, industrial drums, oil pans, portable toilets, hospital bed pans, and animal breeding kennels.

An alternative embodiment of liner bag 20 is shown in FIG. 12. Rather than having a sealed bag top edge 28 and removal tear strip 36, the embodiment shown in FIG. 12 illustrates the use of a closure or seal 66, such as a reciprocating pressure seal as sold under the trademark "ZIF LOCK", in conjunction with the retaining band 32 embodiment illustrated in FIG. 5. Alternatively, seal 66 can be used in conjunction with the tunnel fold 54 embodiment shown in FIG. 9, or any of the embodiments discussed in this application. Seal 66 is utilized to securely retain absorbent material 40 within bag 20 for storage and shipment. Retaining band 32 holds bag 20 around container 60. After waste material is received within bag 20, seal 66 is used to close bag 20 for disposal. Liner bag 20 shown in this embodiment may optionally contain a removal tear strip 36 (not shown), using other closure methods described in reference to other embodiments to close bag 20.

FIG. 13 illustrates an alternative embodiment of the liner bag shown in FIGS. 9 and 10. Tunnel fold 54 is positioned on the outside surface 44 of liner bag 20 and contains a finger access port 68. Formation of tunnel fold 54 is described with reference to FIGS. 9 and 10. Tunnel fold 54 can contain retaining band 32, or a non-elastic closure band 53, such as string or a flexible plastic, for securely positioning bag 20 around container 60. After use of absorbent material 40 or pad 48, retaining band 32 or closure band 53 contained within tunnel fold 54 can be grasped and pulled by the consumer's finger utilizing finger access port 68. Retaining band 32 or closure band 53 may be pulled up and twisted over bag 20, becoming a closure loop, and tightened for closure and disposal of liner bag 20. Bag 20 may contain in tunnel 56 both retaining band 32 for retaining bag 20 around container 60, and closure band 53 for securing bag 20 before disposal. In this instance, band 32 is secured to bag 20, and closure band 53 is positioned over band 32 so that it is proximate to outside surface 44 of bag 20 for easier access by the consumer. Tunnel fold 54 is preferably positioned in the interior of bag 20, but may be on the outside surface 44 of bag 20.

Another alternative embodiment of liner bag 20 is set forth in FIG. 14. Liner bag 20 includes tunnel fold 54 containing retaining band 32 or closure band 53 (not shown), tear strip 36, sealed bag top edge 28, and side gussets 70, 72. Retaining band 32 or a flexible closure band 53 are incorporated into bag 20 in a stretched, non-relaxed state. Gussets 70, 72 permit expansion and reinforcement of liner bag 20 so that more absorbent material can be contained within liner bag 20. The plastic film material preferably used for liner bag 20 can be gusseted to varying dimensions, such as eighteen inches by seventeen inches, or nineteen inches by sixteen inches, depending on the size of the container and the amount of absorbent material to be placed in bag 20.

FIG. 15 refers to another embodiment of liner bag 20 which has gussets 70, 72 which extend the entire height of bag 20. In this embodiment, liner bag 20 and side gussets 70, 72 are heat sealed at the panel top edges 28. Liner bag 20 includes tear strip 36 and tunnel fold 54 in the interior of bag 20 which contains retaining band 32 or closure band 53 (not shown). Liner bag 20 is heat sealed at the bottom edge 22. Retaining band 32 is positioned in tunnel fold 54 in a flat, unstretched state, so that side gussets 70, 72 are maintained. Bag 20 is manufactured, filled, and shipped flat.

Referring now to FIG. 16, another embodiment of liner bag 20 is shown. In this embodiment, an adhesive band 74 is secured to liner bag 20 near the bag top edge 28 of liner bag 20. A peel-off strip 76 is positioned over adhesive band 74 during the storage and/or shipment of liner bag 20. At the time liner bag 20 is to be utilized, peel-off strip 76 is removed. Adhesive band 74 is turned and positioned over and under rim 64 on container 60, and is pressed against container 60 so that the top edge 28 of liner bag 20 adheres to and is retained on container 60. Adhesive band 74 may be a double-sided tape, such as sold under the trademark 3M Scotch ™ brand 950. Alternatively, a hook and loop strip, such as sold under the trademark Velcro ®, could be used instead of adhesive band 74.

FIG. 17 illustrates an alternative embodiment of liner bag 20. In this embodiment, retaining band 32 or a draw string or closure band 53 is threaded or woven through draw string perforations 78 and liner bag 20. Draw string or closure band 53 or retaining band 32 can be grasped with the fingers and pulled to close liner bag 20 for disposal. Perforations 78 may include holes, slits, or variously configured openings.

To form the flexible liner bags 20 of the present invention, a plastic gusseted film, such as a low density/- linear low density virgin polyethylene resin blend film, sized to fit in the appropriate container is utilized. The plastic film may be a continuous sheet or tube of material or may be separate front and rear panels, although tubed material is preferred. The film may be gusseted to, for instance, nineteen inches by sixteen inches. Plastic film that is not gusseted may also be used for bag 20. One end of the tubed plastic film is heat sealed to form bag bottom edge 22. Side edges 24, 26 are also heat sealed to form a bag 20 if separate panels of material are used.

To form the embodiment of bag 20 containing tunnel fold 54, retaining band 32 made from an elastic material is positioned on the outside surface 44 of bag 20, approximately four to six inches from the top edges 28 of the open unsealed end of liner bag 20. The plastic film material is folded down over elastic band 32 toward the outside surface 44 and bag bottom edge 22 of liner bag 20. The plastic film is heat sealed below the position of the elastic band 32, approximately ½ inch to ¾ inch from the top of tunnel fold 54. Closure cuff 35 is folded back again, over tunnel fold 54, toward top edges 28, so that tunnel fold 54 is preferably positioned on the interior surface 45 of bag 20, thereby further protecting retaining band 32 during shipment and storage. If tunnel fold 54 is positioned on the exterior surface 44 of bag 20, the plastic film material is folded down over retaining band 32 toward inside surface 45 and bag bottom edge 22 of bag 20.

Alternatively, if the embodiment form does not contain tunnel fold 54, retaining band 32 may be attached approximately four to six inches from the top edges 28 of liner bag 20 in one spot, as shown in FIG. 1 or FIG. 4; may be secured to the entire circumference of liner bag 20, as shown in FIG. 5; or may be threaded through liner bag 20, as shown in FIG. 17.

Liner bag 20 is heat sealed at top edges 28 of liner bag 20, leaving the access fill opening 30 unsealed at the approximate center of bag 20. Access fill opening 30 may be offset from the center of liner bag 20.

Tear strip 36 is produced in closure cuff 35 by perforating or weakening the plastic film material, as discussed above, between the bag top edge heat seal 28 and the top of tunnel fold 54, or retaining band 32, if other embodiments are utilized.

Next, liner bag 20 is filled with an absorbent material 40 utilizing a funnel 38 positioned within the access fill opening 30. Alternatively, an absorbent pad 48 may be inserted into liner bag 20 through opening 30. In addition, absorbent pad 48 may be utilized in conjunction with an absorbent material 40 contained within liner bag 20. Bag 20 and absorbent product 40 or absorbent pad 48 may be sanitized or sterilized. In addition, absorbent product 40 may be scented or treated before insertion into bag 20.

After the absorbent product 40 and/or absorbent pad 48 is inserted into liner bag 20, bag 20 may be optionally vacuum packed using a vacuum tube positioned within access opening 30. Fill access opening 30 is then heat sealed, and the entire bag top edge 28 of bag 20 is securely closed. Sealed bag 20 retains absorbent product 40 and absorbent pad 48 in bag 20 during storage and/or shipment of liner bag 20.

To use liner bag 20, bag 20 containing absorbent product 40, is placed into container 60. Tear strip 36 is removed by tearing along the perforations, slits, or weakened plastic, so that the top edge 28 of bag 20 and a part of bag 20 are removed and discarded. A portion 33 of the film material of bag 20 remains above retaining band 32 after tear strip 36 is removed. Retaining band 32, closure band 53, including the bag material above band 32 or band 53, or, alternatively, adhesive strip 74, is positioned over and under the rim 64 of the container 60 so that liner bag 20 is held securely in place in an open and receiving state during use of absorbent product 40 or absorbent pad 48 to collect and absorb different types of waste material, including liquid waste materials such as urine and oil.

After absorbent material 40 or pad 48 has been utilized to collect and contain the waste material, liner bag 20 is removed from container 60 by stretching and removing retaining band 32 or closure band 53 from and over the rim 64 of the container 60, or by releasing adhesive strip 74 from container 60. Liner bag 20 containing the soiled absorbent product 40 is then ready for disposal. Twist seal 42 is removed from adhesive strip 46 and is twisted around the open top edges 28 of bag 20 to secure and tightly close the open top edges 28 of liner bag 20 before disposal. Alternatively, a draw string, closure band material 53, loop 51, or retaining band 32 positioned on either the interior surface 45 or the outside surface 44 of bag 20 can be pulled up and looped and twisted over the top edges 28 of bag 20 to tightly secure and close the opening of liner bag 20 for disposal. The consumer determines how tightly to pull the string or band 32 or band 53. Thus, retaining band 32, closure band 53, loop 51, or twist seal 42 may be utilized in each of the described embodiments to close bag 20 before disposal of bag 20 containing the waste products.

Liner bag 20 may be used in a wide variety of applications. Bag 20 may be used as a liner bag for an animal litter box. Bag 20 may be placed in a container and positioned under a vehicle or machine to catch oil drippings or other waste products. In addition, liner bag 20 may be used inside portable or hospital bedside toilets to collect biological waste. Further, liner bag 20 can be positioned in a cylindrical drum for shipping dry powders or other materials. Liner bag 20 can also contain an absorbent bedding product used by animal breeding industries.

Liner bag 20 has many advantages. If liner bag 20 is used to carry an absorbent product 40, such as cat litter or animal bedding, dust caused by product breakdown and pouring into the container is contained within bag 20, and thus, there is a dust abatement aspect to the invention. In addition, liner bag 20 can be closed tightly for disposal, without having to directly handle the soiled absorbent material or the waste product in any manner. This has safety, health and cleanliness implications, such as reduced risk of infection by toxocara cati. Any component of bag 20 may be made of a biodegradable or recycled product, or from a renewable resource. If a double sheeted bag 20 or a thicker bag 20 is used, a built in barrier exists to protect against excessive clawing or scratching by an animal. Use of bag 20 containing an absorbent product has both the cost and time saving advantages of including the absorbent product within one bag, so that purchase of both a liner bag and a separate absorbent product is not required. In addition, use of a liner bag aids in cleaning or reconditioning a receptacle or container, and adds to the life of the container since the majority of the waste material is received by and retained in the liner bag. Bag 20 may contain a variety of absorbent or non-absorbent materials, or may simply be used as a liner bag without containing any product. In particular, bag 20 is advantageous in that it may be a transportable package to contain an absorbent product or pad during shipment and storage, may be used as a liner bag to collect and contain a waste disposal product by removal of the tear strip section in the closure cuff area, and may be used as a disposal bag for the waste products by easily closing and securing the bag.

I claim:

1. A flexible bag for containing an absorbent product, comprising:
   a) a flexible bag having front and rear panels each having a top edge, a bottom edge, and two side edges, the front and rear panels being joined and sealed at the bag bottom edges, the top edges forming a top opening for accessing an interior portion of the bag;
   b) removal means positioned proximate the top edges of the bag, the removal of the bag proximate the top edges of the bag prior to use of the bag for collection and containment of waste material; and
   c) resilient means located on the panels of the bag between the removal means and the bag bottom edge, the resilient means providing bag structure for selectively retaining the front and rear panel top edges in an open, separated manner for receiving waste material after removal of the portion of the bag;
   d) an absorbent material selected from the group consisting of earthen soil, fertilizer, pelletized aspen, and particulate clay litter; and
   e) an absorbent pad means for absorption of a liquid material.

2. The flexible bag of claim 1, wherein the absorbent pad comprises a material selected from the group consisting of recycled paper, pressed paper, woven plastic, and woven fabric.

3. A flexible bag for efficient filling with an absorbent product, comprising:
   a) flexible front and rear panels each having a top edge, a bottom edge, and two side edges; the front and rear panels being joined and sealed along the bottom edges; the top edges being sealed only along part of the length of the top edges;
   b) removal means positioned proximate the bag top edges, the removal means permitting removal of a portion of the bag proximate the top edges of the bag prior to use of the bag for collection and containment of waste material;
   c) resilient means located on at least one panel between the removal means and the bottom edges, the resilient means providing bag structure for selectively retaining the front and rear panel top edges in an open, separated manner for receiving waste material; and
   d) an absorbent material located within the bag.

4. The waste absorption system of claim 3, the absorbent material being added to the flexible bag through the top edges at a location where the top edges are not sealed.

5. A flexible bag suitable for transporting an absorbent product, collecting waste products in a container, and disposal of waste products, comprising:
   a) a flexible bag having front and rear panels each having a top edge, a bottom edge and two side edges, the front and rear panels being joined and sealed at the bottom edges and the top edges, the side edges being continuously joined, the bag having an interior surface;
   b) a tear strip positioned proximate the top edges of the bag, the tear strip permitting removal of a portion of the bag proximate the top edges of the bag prior to use of the bag for collection and containment of waste materials;
   c) tunnel means located along the length of the bag between the tear strip and the bottom edges, the tunnel means being positioned on the interior surface of the bag;
   d) elastic means located along the length of the bag between the tear strip and the bottom edges, the elastic means being positioned within the tunnel means, the elastic means providing bag structure for selectively retaining the front and the rear panel top edges in an open, separated manner in the container for receiving waste material;
   e) closure means positioned on the bag for securely closing the top edges of the bag for disposal; and
   f) an absorbent product located within the bag;
   whereby the flexible bag containing the absorbent product may be readily shipped and stored until a need arises for waste absorption, at which time the tear strip may be easily torn off and the remaining portion of the bag may be positioned within and retained about the container with the elastic means to receive and absorb waste materials, and then tightened and closed with the closure means for disposal of the bag containing the waste products.

* * * * *

UNITED STATES PATENT AND TRADEMARK OFFICE
CERTIFICATE OF CORRECTION

PATENT NO. : 5,404,999
DATED : April 11, 1995
INVENTOR(S) : Donna M. Bednar

It is certified that error appears in the above-indentified patent and that said Letters Patent is hereby corrected as shown below:

Column 2, line 2, after "bag" insert --,--.

Column 3, line 2, "blind" should be --band--.

Column 3, line 41, after "bag" delete --:--.

Column 5, line 51, "ZIF" should be --ZIP--.

Column 9, line 18, after "removal" insert --means permitting easy opening of the flexible bag by removal of a portion--.

Signed and Sealed this

Twenty-ninth Day of August, 1995

Attest:

BRUCE LEHMAN

*Attesting Officer*  *Commissioner of Patents and Trademarks*